United States Patent [19]
Cox

[11] 3,829,130
[45] Aug. 13, 1974

[54] TRAILER HITCH

[76] Inventor: A. B. Cox, 101 Victoria, Cleveland, Miss. 38732

[22] Filed: May 7, 1973

[21] Appl. No.: 357,552

[52] U.S. Cl. ................................. 280/479, 294/88
[51] Int. Cl. .............................................. B60 1/10
[58] Field of Search .................... 280/477, 479, 504; 294/118, 88

[56] References Cited
UNITED STATES PATENTS

| | | | |
|---|---|---|---|
| 2,505,923 | 5/1950 | Taylor et al. | 280/504 X |
| 3,130,982 | 4/1964 | Raney | 280/477 |
| 3,164,406 | 1/1965 | Barry | 294/88 |
| 3,513,998 | 5/1970 | Stone | 294/88 X |

FOREIGN PATENTS OR APPLICATIONS

| | | | |
|---|---|---|---|
| 1,206,686 | 2/1960 | France | 280/402 |

Primary Examiner—Leo Friaglia
Assistant Examiner—Randall A. Schrecengost
Attorney, Agent, or Firm—John R. Walker, III

[57] ABSTRACT

A trailer hitch including a remotely actuated grapple which is intended to grippingly engage the tongue structure of a trailer conveniently along the length thereof. The grapple is pivotally attached to support structure by a vertical pivot pin to facilitate turning the trailer. A pair of springs are interposed between the grapple and the support structure to yieldably urge the grapple toward a centered position when not connected to a trailer. The grapple includes serrated jaws for biting into the tongue. Also, lug structure disposed subjacent the jaws is included to pick up the tongue and support it in a towing position prior to the jaws being caused to grip the tongue. The lugs engage the lower surface of the tongue and slide freely towards the free end thereof as the towing vehicle is caused to move in a direction away from the trailer.

10 Claims, 6 Drawing Figures

TRAILER HITCH

BACKGROUND OF THE INVENTION
1. Field of the Invention

This invention relates to trailer hitches and is particularly directed toward remotely operated trailer hitches.

2. Description of the Prior Art

A preliminary patent ability search revealed the following U.S. Patent Nos.: the Hendricks 2,269,023; the Taylor et al. 2,505,923; and the Raney 3,130,982. None of the above patents show or suggest applicant's device.

The present invention, while being advantageous for many purposes, is particularly directed toward expediting the hookup of a farm-type tractor to a cotton trailer. The usual practice in attaching a cotton trailer to a tractor is to manually lift and position the tongue of the trailer to the drawbar of the tractor, i.e., aligning an aperture in the tongue with an aperture in the drawbar of the tractor so that a vertical pivot pin or bolt may be received in the aligned apertures. This practice has several disadvantages among which are: First, the hookup requires the employment of two workmen, i.e., one workman operating the tractor and the second workman lifting and positioning the tongue of the trailer. Second, the hookup is time-consuming and particularly strenuous. Third, personnel injuries often occur as a result of workmen getting their hands or the like caught in between certain structure. Fourth, the output of a cotton gin often is adversely affected by the delay in getting the trailer hooked up and properly positioned adjacent the gin.

SUMMARY OF THE INVENTION

The present invention is directed towards overcoming the disadvantages and problems relative to previous trailer hitches. The concept of the present invention is to provide a remotely operated trailer hitch which is quickly and easily operated by the operator of a farm tractor or the like while sitting in the operator's position and which may be hitched to any conventional trailer tongue, i.e., including two-wheel and four-wheel trailers.

The trailer hitch herein disclosed includes a remotely actuated grapple which is intended to grippingly engage the tongue structure of a trailer conveniently along the length thereof. The grapple is pivotally attached to support structure by a vertical pivot pin to facilitate turning the trailer. A pair of springs are interposed between the grapple and the support structure to yieldably urge the grapple toward a centered position when not connected to a trailer. The grapple includes serrated jaws for biting into the tongue. Also, lug structure disposed subjacent the jaws is included to pick up the tongue and support it in a towing position prior to the jaws being caused to grip the tongue. The lugs engage the lower surface of the tongue and slide freely towards the free end thereof as the towing vehicle is caused to move in a direction away from the trailer. The advantages of the present trailer hitch are: First, the hookup can be accomplished by the employment of only one workman, i.e., the tractor operator. Second, the hookup is accomplished in minimal time with little or no effort on the part of the workman. Third, personnel injuries of the type above disclosed are precluded. Fourth, the output of the cotton gin may be increased by eliminating the delay in properly positioning the loaded trailers. Fifth, the trailer hitch of the present invention does not require a specially configured receiving member to be attached to the trailer, e.g., like those disclosed in the aforementioned '023 and '982 patents. More specifically, the trailer hitch of the present invention may be attached to any conventional trailer tongue conveniently along the length thereof without any modification being necessary to the trailer.

DESCRIPTION OF THE PREFERRED EMBODIMENT

Figure 6:
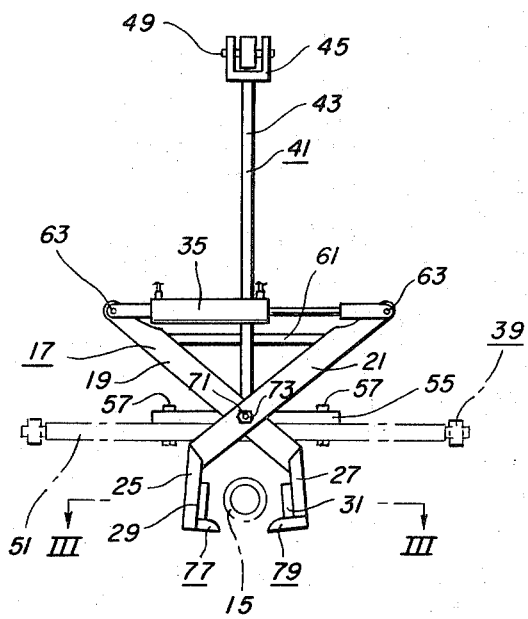
FIG. 6 is an end view of the hitch of the present invention, also showing portions of the three-point lift structure of the tractor in phantom.

The hitch 11 of the present invention is intended for towing a trailer 13 having a tongue 15, e.g., the typical cotton trailer used to transport cotton from the cotton picker to the cotton gin. It should be understood that the hitch 11 may be used for towing two-wheel or four-wheel conventional trailers, i.e., the trailer need not be modified with special structure for adaptation therewith. Accordingly, the tongue 15 may be circular in cross section as shown in FIG. 6 of the drawing or it may have another shape thereto such as rectangular or the like.

The hitch 11 includes grapple means 17 for grippingly engaging the tongue 15 conveniently along the length thereof. The grapple means 17 includes a pair of diagonally disposed levers 19, 21 pivotally connected one to the other intermediate the lengths thereof by a horizontal pivot means 23. A pair of depending legs 25, 27 are included and rspectively being angularly disposed with respect to the levers 19, 21, are fixedly attached thereto as by welding or the like. Additionally, a pair of coacting jaws 29, 31 which have inwardly directed teeth, as best shown by the numeral 33 in FIGS. 3 and 4, for biting into the tongue in a manner yet to be disclosed. The jaws 29, 31 are fixedly attached respectively to the depending legs 25, 27 as best shown in FIG. 6 of the drawings. The grapple means 17 also includes means, such as hydraulic cylinder and piston means 35, interposed between the levers 19, 21 adjacent the upper ends thereof as clearly shown in FIG. 6 of the drawings. The cylinder and piston means 35 is remotely actuated in a manner obvious to those skilled in the art for moving the jaws 29, 31 between an open position as shown in FIGS. 3 and 6 of the drawings and a closed position as shown in FIG. 4 of the drawings.

Figure 3:
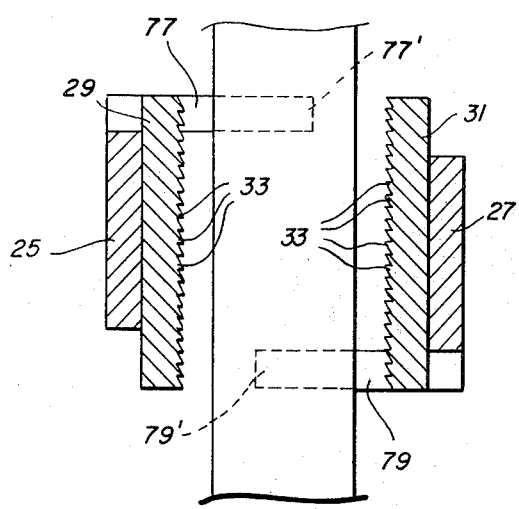
FIG. 3 is an enlarged sectional view taken as on the line III—III of FIG. 6 showing the open jaws and the lugs extending therebeneath for picking up the trailer tongue.
Figure 4:
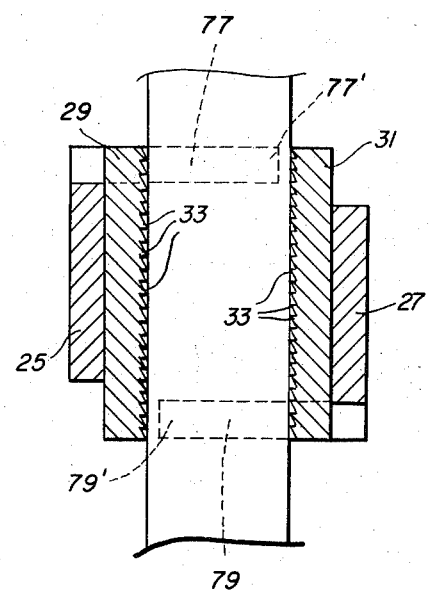
FIG. 4 is an enlarged sectional view similar to FIG. 3 but showing the jaws in a closed or gripping position with respect to the tongue of the trailer.

From FIGS. 3 and 4 of the drawings it may also be seen that the teeth 33 are vertically extending. Further, the teeth 33 on one of the jaws, e.g., the jaw 29, are inclined as depicted so as to bite into the tongue 15 of the trailer 13 when a forward directed force is applied to the hitch 11. Conversely, the teeth 33 on the other one of the jaws 31 are inclined as depicted so as to bite into the tongue 15 of the trailer 13 when a rearward force is applied to the hitch 11.

Figure 1:
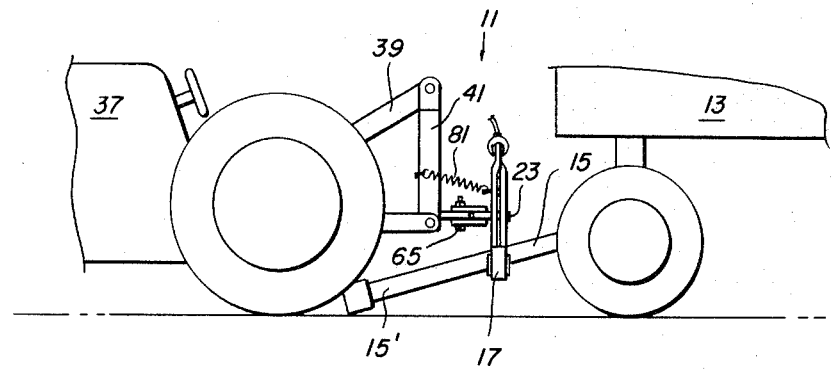
FIG. 1 is a side elevational view of the trailer hitch of the present invention shown attached to the aft end of a tractor and engaged with the tongue of a trailer.
Figure 2:
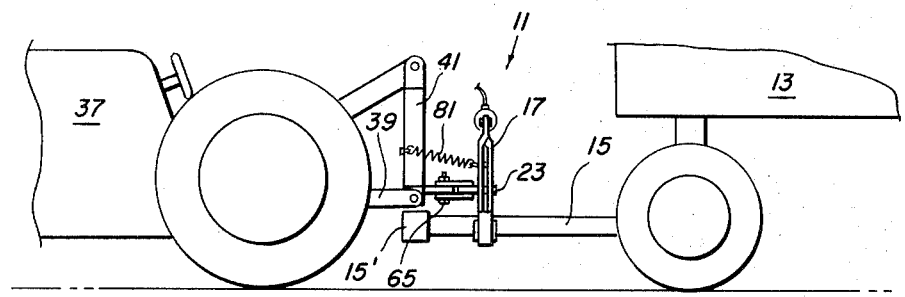
FIG. 2 is a view similar to FIG. 1 except the tongue of the trailer has been lifted by the forward motion of the tractor and the jaws have been closed clampingly thereon.
Figure 5:
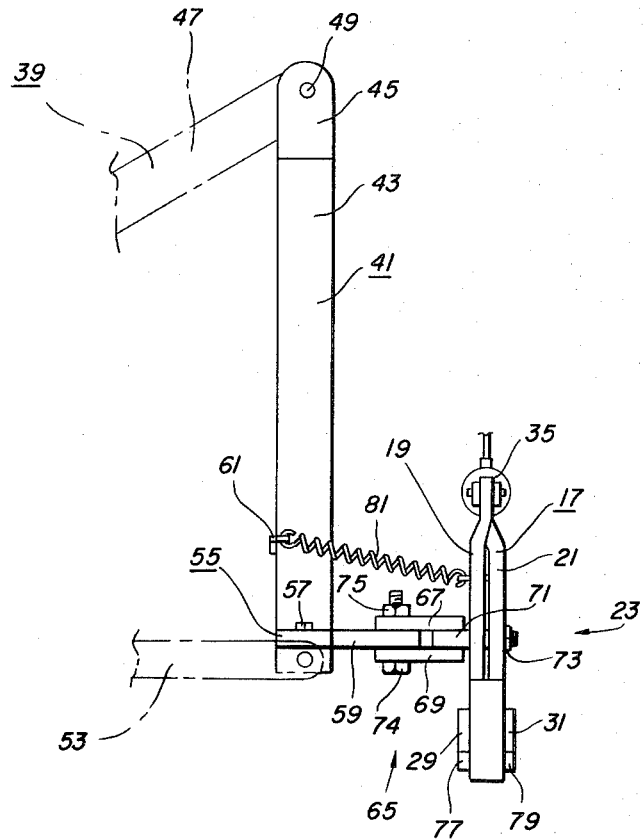
FIG. 5 is a side elevational view of the hitch of the present invention, showing the usual three-point lift structure of the tractor in phantom.

It should be understood that the hitch 11 is intended to be attached to a vehicle, e.g., a farm tractor 37 or the like as depicted in FIGS. 1 and 2 of the drawings. The tractor 37 preferably, though not necessarily, includes a well-known three-point hitch or lift shown as at 39. Accordingly, the hitch 11 preferably includes support means 41 for facilitating attachment thereof to the three-point lift 39. Referring now to FIGS. 5 and 6 of the drawings wherein it may be seen that the support means 41 includes a vertical support member 43 preferably terminating upwardly thereof with a yoke 45 which is intended to be pivotally attached to an upper diagonal member 47 of the three-point lift 39 by a pivot pin 49 or the like. It should be pointed out that the three-point lift 39 also includes a horizontally disposed drawbar 51 which is pivotally connected adjacent the opposite ends thereof to a pair of lower lift members 53 in a well-known manner. The support means 41 also includes a horizontal support member 55 which is fixedly attached to the vertical support member 43 in any well-known manner as by welding or the like, and is removably attached to the drawbar 51, as by a pair of bolts and nuts as at 57 or the like. From FIG. 5 of the drawings it may be seen that the horizontal support member 55 includes a rearward protruding portion 59 disposed intermediate the length of the member 55 and is fixedly attached as by welding or the like thereto. A transversely disposed member 61 is included and is disposed substantially parallel with the horizontal support member 55 in a spaced distance thereabove. The member 61 is fixedly attached to the vertical support member 43 for reasons yet to be disclosed. It will be understood that other types of couplers, other than a three-point lift, may be used without departing from the spirit and scope of the present invention. As for example, a straight drawbar may be provided on the tractor and which would take the place of portion 59 and the three-point hitch.

The hydraulic actuated cylinder and piston means 35 is interposed between the pair of levers 19, 21 adjacent the upper ends thereof and is pivotally attached thereto as by pivot pins 63 clearly shown in FIG. 6 of the drawings.

The hitch 11 also includes vertical pivot means 65 for pivotally coupling the grapple means 17 to the support means 41. The vertical pivot means 65 includes a pair of vertically spaced apart plate members 67, 69 disposed in respective horizontal planes for sandwiching therebetween a bolt member 71 which is a pivot for the horizontal pivot means 23. The bolt 71 is fixedly attached as by welding or the like to the plate members 67, 69. A nut 73 is threadedly received on the free end of the bolt 71 to pivotally secure the levers 19, 21 thereto, i.e., allowing pivotal movement of the levers as the cylinder and piston means 35 are actuated. The vertical pivot means 65 also includes a bolt 74 and a nut 75, the bolt 74 being received in suitably aligned apertures (not shown) in the plates 67, 69 and the rearward protruding portion 59 of the horizontal support member 55. In other words, the plate members 67, 69 are free to pivot about the bolt 74 and the nut 75 secures the bolt 74 in place.

The grapple means 17 also includes at least one but preferably two lugs 77, 79 for engaging the lower surface of the tongue 15 of the trailer 13 and for lifting and restingly slidably supporting the free end as at 15' of the tongue 15 as the tractor 37 is caused to move in a direction away from the trailer 13. The lugs 77, 79 are staggered as clearly shown in FIGS. 3 and 4 to allow the serrated jaws 29, 31 to touch each other when fully closed. It should be understood that the lugs are disposed downwardly from the jaws 29, 31 as shown in FIG. 6. the lugs 77, 79 are fixedly attached as by welding or the like respectively to the lugs 25, 27. The tongue 15 is free to pivot about a horizontal axis in a manner obvious to those skilled in the art and the lugs 77, 79 are free to slide along the length of the tongue 15 to lift the free end thereof, i.e., with the jaws being open as shown in FIG. 3 of the drawings.

The hitch 11 is attached to the trailer 13 in the following manner. First, the jaws 29, 31 are placed in a wide open position, i.e., like that shown in FIG. 6 so that the free ends 77, 79 of the respective lugs, 77, 79 will freely bypass the tongue 15. Second, the tractor 37 is backed toward the trailer 13 to a position substantially as depicted in FIG. 1 of the drawings. Third, the jaws 29, 31 are closed slightly or moved to the open position depicted in FIG. 3 of the drawings, i.e., the lugs 77, 79 being moved to a position so that portions thereof are beneath the tongue 15 and the teeth 33 of the jaws 29, 31 are not engaging the tongue 15. Fourth, the tractor is moved in a direction away from the trailer 13 which causes the lugs 77, 79 to engage the lower surface of the tongue 15 and to slide along the length of the tongue 15 to lift the free end thereof to a position substantially as depicted in FIG. 2 of the drawings. Fifth, the jaws 29, 31 may now be moved to the closed position as depicted in FIG. 4 of the drawings so that the teeth 33 grippingly bite into the tongue 15. It should be understood that the jaws 29, 31 may be made to engage the tongue 15 conveniently along the length thereof to expedite the hookup whereby the trailer 13 may be towably transported by the tractor 37. Further, the aforementioned oppositely inclined teeth 33 of the jaws 29, 31 prevent the jaws 29, 31 from slipping with respect to the tongue 15 in both a forward and reverse direction to facilitate movement of the trailer 13 in both a forward and reverse direction.

From FIG. 6 of the drawings it may be seen that the upper surfaces of the lugs 77, 79 are slanted downwardly and outwardly toward the free ends 77', 79' respectively. This is to enable the force of gravity to disengage the tongue 15 from the lugs 77, 79 when the grapple means 17 is actuated to the open position as shown in FIG. 6 of the drawings subsequent to engagement of the grapple means 17 with the tongue 15. In other words, the slanted upper surfaces of the lugs 77, 79 obviate any tendency of the tongue to not free itself from the lugs 77, 79 when the grapple means 77 is moved to the open position as shown in FIG. 6 of the drawings. This tendency would obviously be more pronounced for a tongue having a flat or planar lower surface and the lugs having a flat or planar upper surface.

The hitch 11 also includes bias means, e.g., a pair of pull springs 81, interposed between the grapple means 17 and the support means 41 for yieldably urging the grapple means 17 to pivot about the vertical pivot means 65 towards a predetermined or intermediate centered position as shown in FIGS. 5 and 6 of the drawings, i.e., the longitudinal axis at the bolt 71 being coincident with an extension of the longitudinal axis of the tractor 37. More specifically, one of the pair of pull springs 81 has one of the ends thereof suitably attached to an outer end of the transverse member 61 and the other end of the spring 81 is suitably attached to the lever 19. Further, the other one of the pull springs 81 has one of the ends thereof suitably attached to the opposite end of the transverse member 61 and the other end of the latter pull spring 81 is suitably attached to the level 21. Accordingly, the grapple means 17 is urged to the centered position when it is free of the tongue 15. In this manner, the hitch 11 is always properly aligned and ready to be hooked up to the tongue 15. It should be pointed out that it is not necessary to accurately position the tractor 37 with respect to the tongue 15, i.e., the longitudinal center line of the tractor 37 can be angularly displaced (within limits) with respect to the longitudinal axis of the tongue 15 without causing any delay or difficulty in effecting the hookup.

Although the invention has been described and illustrated with respect to preferred embodiment thereof, it is to be understood that it is not to be so limited since changes and modifications may be make therein which are within the full intended scope of the invention.

I claim:

1. In combination, a trailer type vehicle including a tongue attached thereto, a tractor, and remotely operated hitch means attached to said tractor for removably attaching said trailer vehicle to said tractor whereby said trailer vehicle may be towably transported by said tractor; said hitch means including grapple means for grippingly engaging said tongue conveniently along the length thereof, said grapple means having open and closed positions, means for remotely actuating said grapple means between said open and closed positions, vertical pivot means for pivotally coupling said grapple means to said tractor, said grapple means being movable about said vertical pivot means to an intermediate centered position, and at least one lug for engaging the lower surface of the tongue of said trailer and for lifting and restingly slidably supporting the free end of the tongue as said tractor is caused to move in a direction away from said trailer.

2. The combination of claim 1 in which said grapple means includes a pair of inwardly directed coacting jaws having vertically extending teeth with said teeth on one of said jaws being inclined to bite into the tongue of said trailer when a forward directed force is applied to said tractor and said teeth on the other one of said jaws being inclined to bite into the tongue of said trailer when a rearward directed force is applied to said tractor.

3. The combination of claim 2 in which said means for remotely actuating said grapple means between said open and closed positions includes hydraulic actuated cylinder and piston means.

4. The combination of claim 1 in which said tractor includes a three-point lift and said remotely operated hitch means includes support means for facilitating attachment thereof to said three-point lift.

5. In combination, a trailer type vehicle including a tongue attached thereto, a tractor, and remotely operated hitch means attached to said tractor for removably attaching said trailer vehicle to said tractor whereby said trailer vehicle may be towably transported by said tractor: said hitch means including grapple means for grippingly engaging said torque conveniently along the length thereof, said grapple means having open and closed positions, means for remotely actuating said grapple means between said open and closed positions including hydraulic actuated cylinder and piston means, vertical pivot means for pivotally coupling said grapple means to said tractor, said grapple means being movable about said vertical pivot means to an intermediate centered position, and bias means interposed between said grapple means and said tractor for yieldably urging said grapple means towards said centered position; said grapple means including a pair of inwardly directed coacting jaws having vertically extending teeth with said teeth on one of said jaws being inclined to bite into the tongue of said trailer when a forward directed force is applied to said tractor and said teeth on the other one of said jaws being inclined to bite into the tongue of said trailer when a rearward directed force is applied to said tractor, a pair of diagonally disposed levers, horizontal pivot means pivotally connecting said pair of levers one to the other intermediate the lengths thereof, and a pair of depending legs respectively angularly disposed with respect to said pair of levers and being fixedly attached thereto, said pair of jaws respectively being attached to said pair of depending legs, and said hydraulic actuated cylinder and piston means being interposed between said pair of levers adjacent the upper ends thereof and being pivotally attached thereto.

6. In combination, a trailer type vehicle including a tongue attached thereto, a tractor, and remotely operated hitch means attaching said trailer vehicle to said tractor whereby said trailer vehicle may be towably transported by said tractor; said hitch means including grapple means for grippingly engaging said tongue conveniently along the length thereof, said grappling means having open and closed positions, means for remotely actuating said grapple means between said open and closed positions, vertical pivot means for pivotally coupling said grapple means to said tractor, and at least one lug for engaging the lower surface of the tongue of said trailer and for lifting and restingly slidably supporting the free end of the tongue as said tractor is caused to move in a direction away from said trailer, said tongue being free to pivot about a horizontal axis and said lug being free to slide along the length of said tongue to lift the free end thereof.

7. A hitch for towing a trailer having a tongue, said hitch including grapple means for grippingly engaging said tongue conveniently along the length thereof, said grapple means having open and closed positions, means for remotely actuating said grapple means between said open and closed positions, support means for supporting said grapple means, vertical pivot means for pivotally coupling said grapple means to said support means; and at least one lug for engaging said tongue, picking up the free end thereof, and restingly slidably supporting said free end prior to said grapple means being actuated to said closed position; said lug engaging the lower surface of said tongue which is free to pivot about a horizontal axis and said lug being free to slide along the length of said tongue to lift the free end thereof.

8. A hitch for towing a trailer having a tongue, said hitch including grapple means for grippingly engaging said tongue conveniently along the length thereof, said grapple means having open and closed positions, means for remotely actuating said grapple means between said open and closed positions, support means for supporting said grapple means, vertical pivot means for pivotally coupling said grapple means to said support means; and at least one lug for engaging said tongue, picking up the free end thereof, and restingly slidably supporting said free end prior to said grapple means being actuated to said closed position; said lug engaging the lower surface of said tongue which is free to pivot about a horizontal axis and said lug being free to slide along the length of said tongue to lift the free end thereof, said upper surface of said lug being slanted downwardly and outwardly toward the free end thereof to facilitate disengagement thereof from said tongue when said grapple means is actuated to said open position subsequent to engagement thereof with said tongue.

9. The hitch of claim 7 in which is included bias means interposed between said grapple means and said support means for yieldably urging said grapple means to pivot about said vertical pivot means towards a predetermined position.

10. A hitch for towing a trailer having a tongue, said hitch including grapple means for grippingly engaging said tongue conveniently along the length thereof; said grapple means including a pair of diagonally disposed levers, horizontal pivot means pivotally connecting said pair of levers one to the other intermediate the lengths thereof, a pair of depending legs respectively angularly disposed with respect to said pair of levers and being fixedly attached thereto, a pair of coacting jaws having inwardly directed teeth for biting the tongue, said jaws being fixedly attached respectively to said pair of legs, and means interposed between said pair of levers adjacent the upper ends thereof and being remotely actuated for moving said jaws between open and closed positions; said coacting jaws being wide spread in said open position and being adjacent one another in said closed position, support means for supporting said grapple means, vertical pivot means for pivotally coupling said grapple means to said support means, said grapple means being movable about said vertical pivot means to an intermediate centered position, bias means interposed between said grapple means and said support means for yieldably urging said grapple means towards said centered position; and at least one lug for engaging said tongue, picking up the free end thereof, and for restingly slidably supporting said free end with said grapple means being in said intermediate position; said lug engaging the lower surface of said tongue which is free to pivot about a horizontal axis and said lug being free to slide along the length of said tongue to lift the free end thereof.

* * * * *